(12) United States Patent
Baroncini

(10) Patent No.: US 6,357,495 B1
(45) Date of Patent: Mar. 19, 2002

(54) DEVICE FOR FILLING A BLISTER BAND WITH PRODUCTS

(75) Inventor: Ivano Baroncini, Ozzano Emilia (IT)

(73) Assignee: I.M.A. Industria Macchine Automatiche S.p.A., Bologna (IT)

( * ) Notice: Subject to any disclaimer, the term of this patent is extended or adjusted under 35 U.S.C. 154(b) by 0 days.

(21) Appl. No.: 09/744,851

(22) PCT Filed: Jul. 30, 1999

(86) PCT No.: PCT/IB99/01352
§ 371 Date: Apr. 16, 2001
§ 102(e) Date: Apr. 16, 2001

(87) PCT Pub. No.: WO00/07881
PCT Pub. Date: Feb. 17, 2000

(30) Foreign Application Priority Data

Aug. 3, 1998 (IT) .......................................... BO98A0485

(51) Int. Cl.[7] ................................................ B65B 35/06
(52) U.S. Cl. ........................ 141/185; 141/129; 141/186; 141/237; 141/240; 141/244; 222/216; 222/230
(58) Field of Search ................................ 141/102, 129, 141/185, 186, 234, 236–238, 240, 242–244; 222/216, 330, 370

(56) References Cited

U.S. PATENT DOCUMENTS

| | | | |
|---|---|---|---|
| 2,629,501 A | | 2/1953 | Curioni |
| 2,828,888 A | | 4/1958 | Nicolle |
| 3,312,152 A | * | 4/1967 | Willimason .................. 141/129 |
| 3,348,455 A | * | 10/1967 | Williamson et al. ........ 141/129 |
| 3,570,557 A | * | 3/1971 | Molins ........................ 141/129 |
| 3,675,755 A | | 7/1972 | Hopwood-Jones |
| 3,901,373 A | | 8/1975 | Rudzinat |
| 4,063,633 A | | 12/1977 | Hall |
| 4,094,127 A | * | 6/1978 | Romagnoli ..................... 53/51 |
| 4,233,801 A | * | 11/1980 | Watt ............................ 53/453 |
| 5,081,816 A | * | 1/1992 | Cardinali ....................... 53/54 |
| 5,377,727 A | * | 1/1995 | Ueda et al. .................. 141/237 |
| 5,802,804 A | * | 9/1998 | Esposti et al. ................. 53/55 |
| 6,053,220 A | * | 4/2000 | Lo et al. ..................... 141/129 |

FOREIGN PATENT DOCUMENTS

GB    869811    6/1961

* cited by examiner

Primary Examiner—J. Casimer Jacyna
(74) Attorney, Agent, or Firm—William J. Sapone; Coleman Sudol Sapone P.C.

(57) ABSTRACT

In a device for filling a blister band with products, a hopper (3) holds the products (2) in bulk and has a open bottom where taking over rollers (17) rotate to slightly push the products upwards, contrasting the products weight and causing reciprocal detachment of the products. The taking over rollers (17) define openings, and one product (2) at a time passes suitably oriented through each opening and towards a conveyor including channels (4) having inlets (4a) situated directly under the openings. A delivering cylinder (7) is connected to the channels (4) and transfers the products (2) to the blisters (5a) of the band 5.

8 Claims, 4 Drawing Sheets

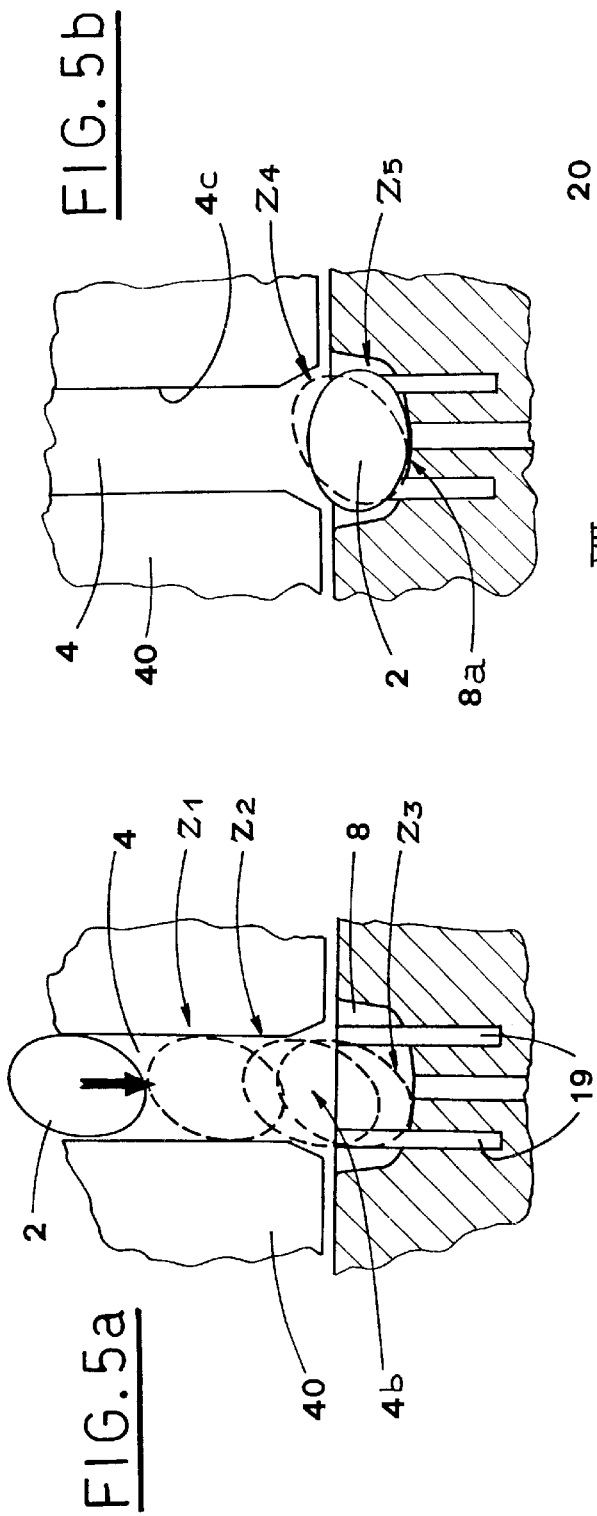
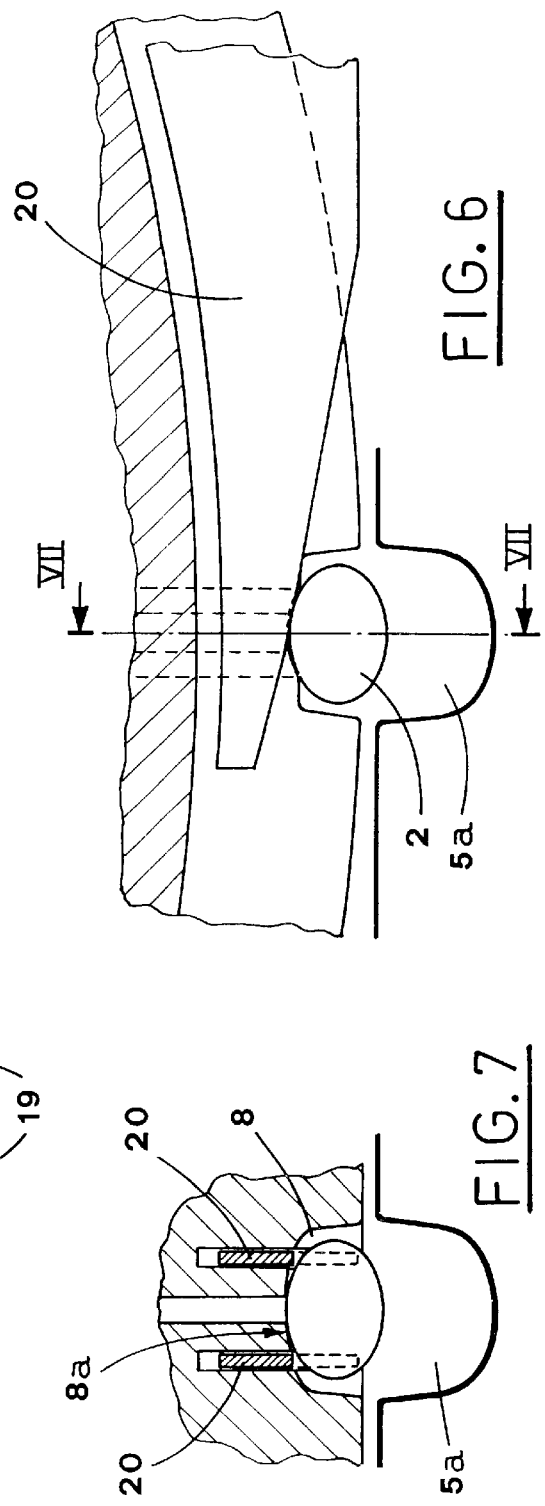

DEVICE FOR FILLING A BLISTER BAND WITH PRODUCTS

BACKGROUND OF THE INVENTION

The present invention relates to automatic packaging of various products, in particular tablets, pills, capsules and the like, in blister packs.

In particular, the present invention relates to a station including a device for feeding products which are placed in the blisters of a band running under the device.

DESCRIPTION OF THE PRIOR ART

Blister packs have been used so far especially for packaging pharmaceutical products. Blister packs are formed by a plate provided with a plurality of receptacles, called blisters, which contain products.

This plate is usually sealed with a sheet of e.g. aluminum and the products are then removed by the user by tearing or ripping this sheet.

The blister packs are obtained by a sequence of operations, usually as follows:

forming, in a special forming station, of one or more lines of blisters in a continuous band of a suitable material, usually heat-formable plastic or a laminate. A laminate is formed by more layers of material, one of which is aluminum;

subsequent passage of the so obtained blister band through a filling station, where at least one product is introduced into each blister;

definite sealing of the surface where the blisters are open by applying and welding a film of e.g. aluminum.

The so obtained, filled blister band is then cut into sections containing a predetermined number of blisters, and consequently, of products, thus defining the blister packs.

Other known apparatuses fill the blisters with products according to other techniques.

One of these apparatuses includes a box-like container without bottom, which is situated directly over the blister band and whose width is not bigger than the width of the blister band.

The band is moved forward with the blisters openings turned towards the inside of the container, so that they pass, one after another therebelow.

The container is fed by a feeding channel which conveys such a number of products to be fed to the blisters, so that they accumulate on the band surface.

Sorting means using brushes and the like, and other distributing means, spread the accumulated products so that they enter empty blisters and translate with the band until they leave the container.

The exceeding products remain inside the container.

The above described system can be used with bands moving in a continuous or intermittent way and does not require the alignment of the products with respect to the corresponding blisters.

However, there is a series of problems connected with the filling technique.

First of all, the products, specially very fragile ones, can be scratched or chipped due to repeated mutual pushes and rubbing against the band surface as well as against the container walls.

Moreover, if the blisters diameter is bigger than the products diameter, each blister can receive more products.

According to another used system for blisters filling, the products are piled in a plurality of channels, each of which is situated right over a line of blisters made along the band.

The lower part of the channels opens onto the band surface and, in time relation with the band movement, the products fall, due to gravity force, into the blisters as they pass below the channel.

The channels are connected in parallel with a basin-like, vibrating feeding device, in which the products are contained in bulk.

The basin vibrations facilitate regular introduction of the products into each channel.

However, the same vibrations damage the products, produce dust and noise.

If the dust is dangerous for the operators, the whole apparatus is closed in a space isolated from outside and connected with appropriate dust collectors.

SUMMARY OF THE INVENTION

The present invention has been evolved with a general object of proposing a device for filling a blister band with products, in particular tablets, pills, and capsules, which device fills each blister with only one product, avoiding damages of products as well as of the blister band, independently from the shape and dimensions of both.

Another important object of the present invention is to propose a device for feeding products, called hereinafter also feeding device, with which the products are not subjected to vibrations, which does not produce dust and which reduces the noise caused by the products being fed to the blister band.

A further important object of the present invention is to propose a device for feeding products, which is highly reliable and productive in any conditions without changing the functionality of the whole packaging machine.

Still another object of the present invention is to propose a device, which uses blister bands made of any material, thus allowing them to be fed with products of different shapes or composition, and allowing particularly rapid and easy the adjustments necessary for adapting the system in relation to the packaging cycle characteristics.

Yet a further object of the present invention is to propose a device for feeding products, which can be used with any blister packaging machine, and which is obtained by a simple, cheap, extremely functional and reliable technical solution.

Another object of the invention is to design a device having reduced dimensions.

The proposed device must also guarantee a correct packaging phase relation when the products are packed into the corresponding blister bands.

The above mentioned objects are obtained, in accordance with the contents of the claims, by a device for filling a blister band with products, with the blister band having at least one longitudinal line of blisters for receiving the products and driven in a forward direction, the device including:

a hopper, the products being stored in bulk within said hopper, with said hopper being delimited by walls and having an open bottom;

taking over means, located at said open bottom of said hopper and acting on said products, so as to slightly push said products upwards, with said taking over means defining at least one opening, with one product at a time passing, suitably oriented, through said opening;

conveying means defining at least one channel having an inlet situated directly under said opening and an outlet;

delivering means, connected to said channel and aimed at transferring products from said conveying means to the blisters of said blister band.

The taking over means include one roller, situated beside one wall of the hopper and rotating upwards in a region where the roller touches said hopper wall, with said roller forming, on its outer surface, at least one circumferential groove, said groove defining, together with said hopper wall, said opening in said region where the roller touches said hopper wall.

BRIEF DESCRIPTION OF THE DRAWINGS

The characteristic features of the present invention will be pointed out in the following description of a preferred embodiment, although other embodiments are possible, with reference to enclosed drawings, in which:

FIGS. 5a, 5b are enlarged schematic views of section V—V of FIG. 1 in two subsequent moments related to a particularly significant operation step:

FIG. 6 is an enlarged schematic view of the particular A of FIG. 1;

FIG. 7 is a section view taken along VII—VII of FIG. 6;

BEST MODES OF CARRYING OUT THE INVENTION

Figure 1:
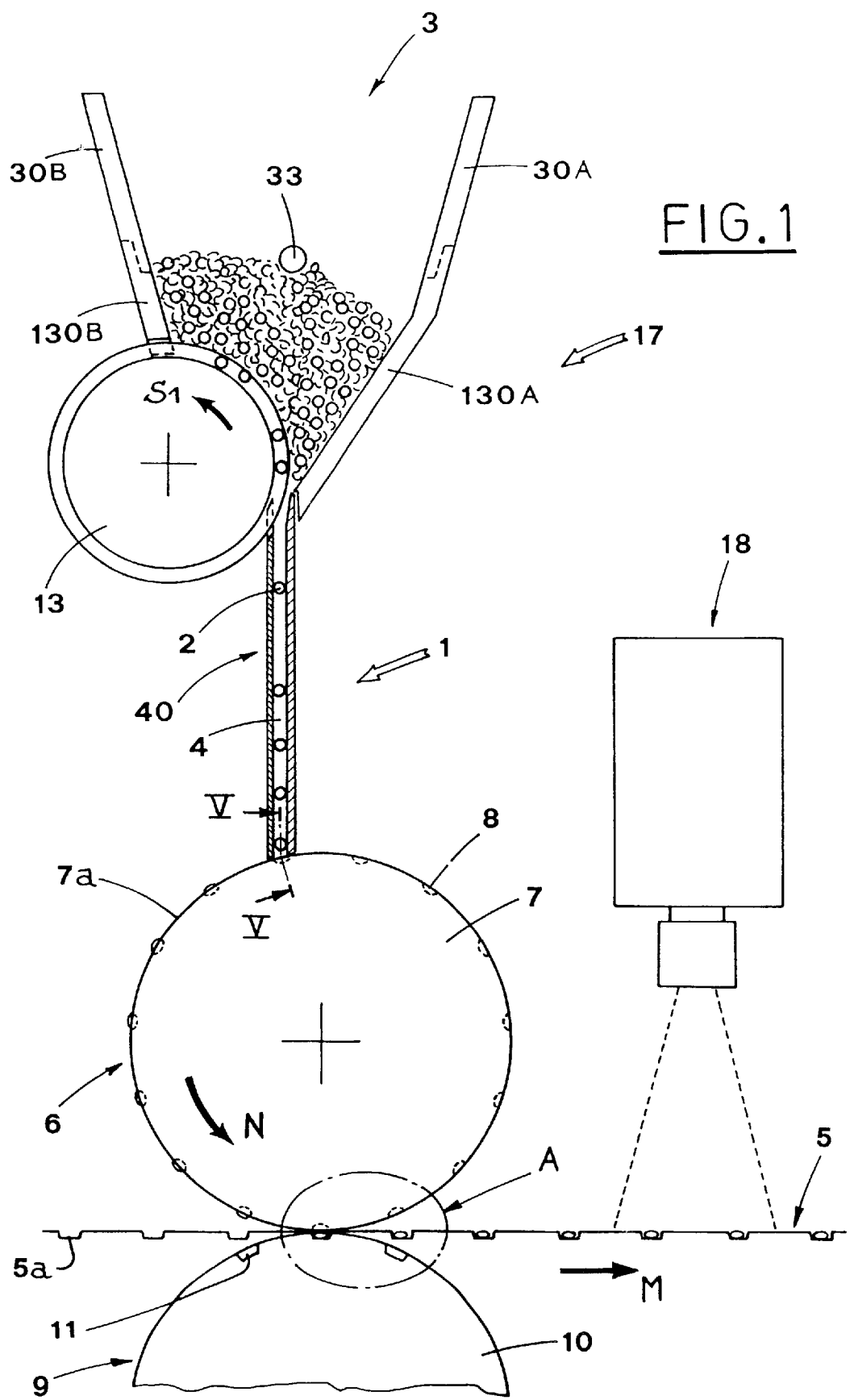
FIG. 1 is a schematic front view of the proposed feeding device, which co-operates with delivering means situated between the device and the blister band.

With reference to the above mentioned drawings, the reference numeral 1 generally designates an example of a device for feeding products 2, which is a part of a blister packaging machine, not shown.

The feeding device includes a hopper 3, which contains the products 2 in bulk. The hopper is connected to taking over means 17 located therebelow and connected in turn to conveying channels 4 made in a flat member 40. The flat member 40 is supported under the taking over means 17 by a stationary frame of the packaging machine, also not shown in that it does not concern the invention claimed herein.

The hopper 3 is delimited by lateral walls 30A, 30B and front walls 31, which contain the products 2.

The bottom of the hopper 3 is closed by the taking over means 17 only.

The bottom rim of the hopper perfectly mates the profile of the corresponding section of the taking over means 17, in a complementary way.

Lower parts 130A, 130D of the lateral walls are removably fastened, in known, not shown way, to respective upper parts of the some lateral walls. The reason for such division of the walls will be explained later.

Suitable sensors 33, of known type, are situated near the bottom of the hopper 3, so that products 2 are fed to the hopper 3 in such quantity that they always keep over a minimum level.

The hopper 3 can also feature sensors, known and not shown, which set the presence of products inside the hopper to a maximum value, so as to ensure the correct operation of the proposed feeding device.

The taking over means 17 include one roller 13, having a toothing 13a.

The toothing 13a touches the part 130A of the lateral wall 30A, which is shaped accordingly in relation to the size.

Figure 8:
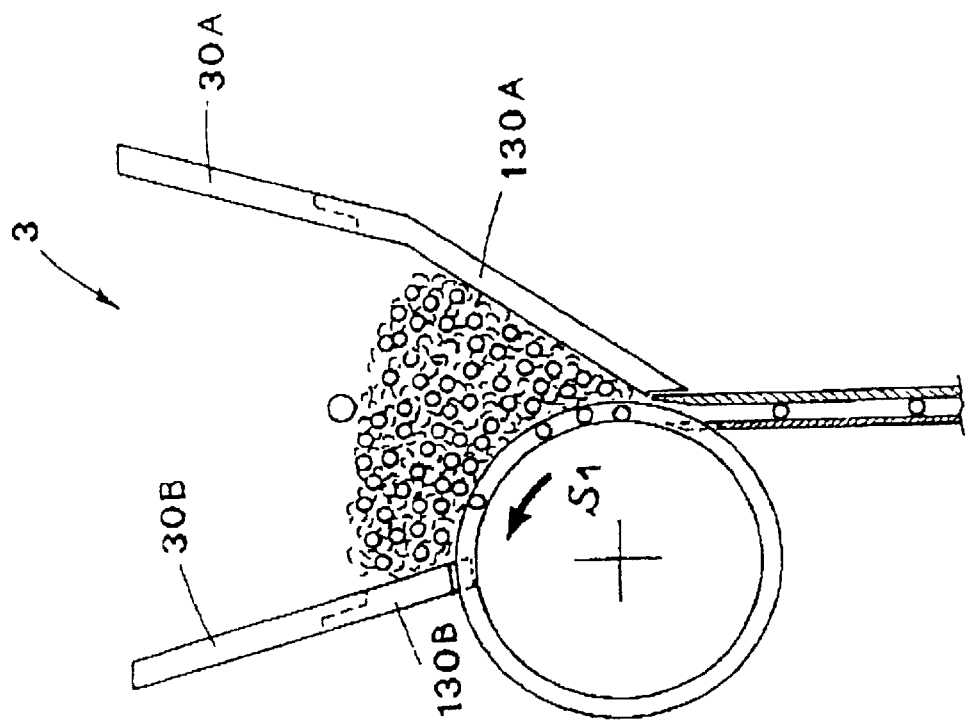
FIG. 8 is a schematic front view of an embodiment of the feeding device.

In particular, the upward rotation direction of the roller moves towards the inside of the hopper, as it appears from FIG. 8.

This feature creates a slight upward movement of the products 2 and thus avoids damages thereto.

The products 2 coming from the hopper 3 are this way conveyed to the channels 4 by the taking over means 17 (FIG. 8).

As mentioned above, the outer surface of the roller 13 features, made therein, a toothing 13a, which defines circular side by side grooves, whose number is equal to the number of the conveying channels 4.

Figure 3:
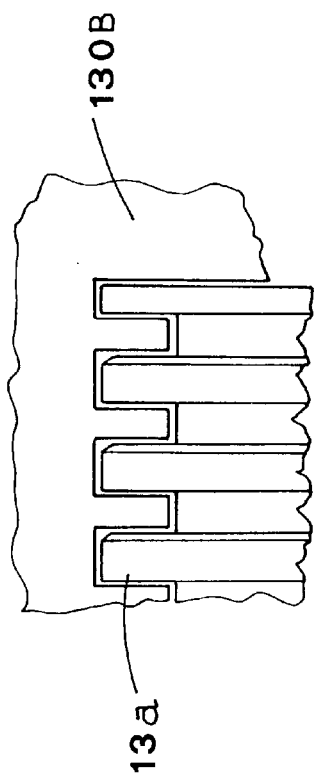
FIG. 3 is an enlarged view of the particular B of FIG. 2.

The lower part 130B of the lateral wall 30B, situated over the roller 13, is shaped in such a way as to match with the corresponding toothing 13A (FIG. 3).

The roller 13 can also be completely smooth or feature, made therein, facets.

Figure 4:
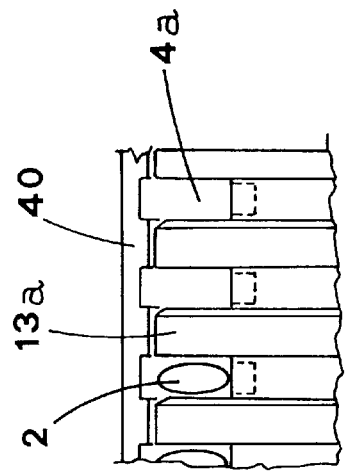
FIG. 4 is a schematic enlarged view as in FIG. 3, showing the central portion of the section IV—IV of FIG. 2, with some parts removed in order to highlight others.
Figure 2:
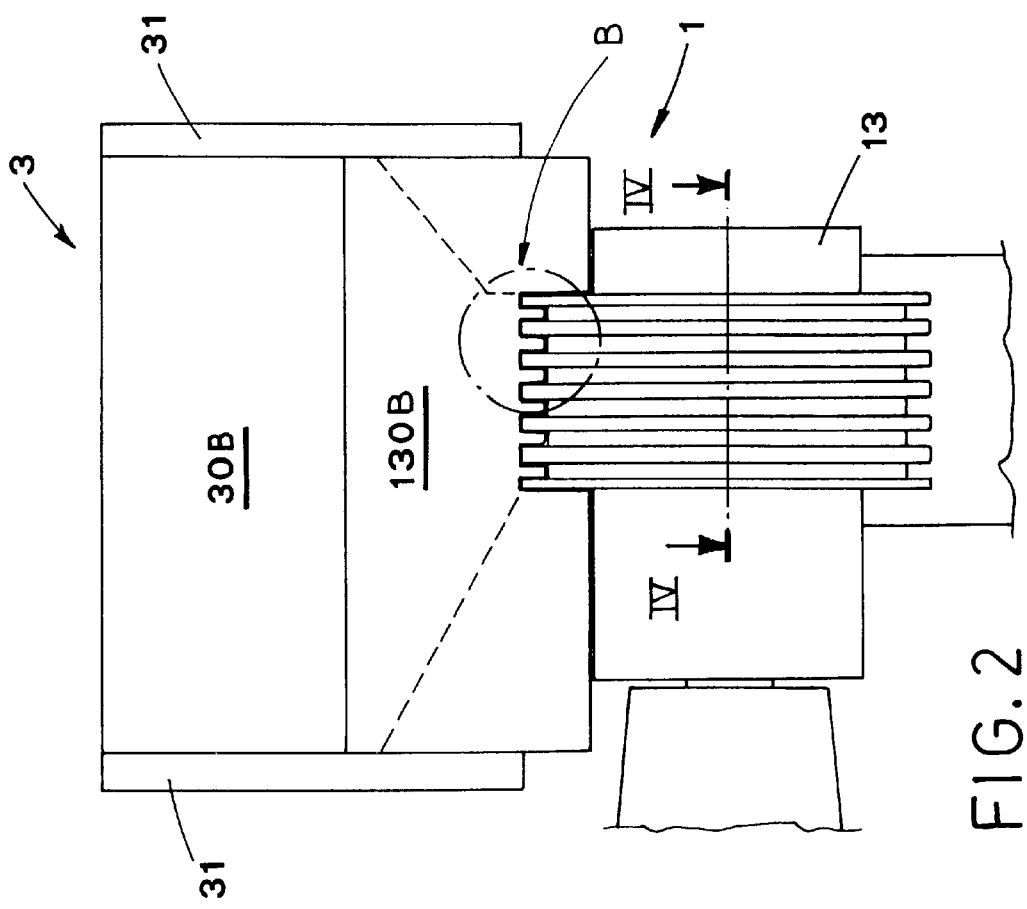
FIG. 2 is a lateral view of the same feeding device.

The grooves defined by the toothing 13a of the roller 13 have such section as to allow passage of one product 2 at a time, and the product must be suitably oriented in each channel 4 (FIG. 4). In other words, considering a horizontal plane passing through the axis of the roller 13, the toothing 13a defines centered sections, which practically coincide with the inlets 4a of the respective channels 4.

Each channel 4, substantially vertical and open at bottom, is aimed at containing a pile of the products 2 to be introduced into relative blisters 5a of a blister band 5.

The products 2, e.g. with a discoid shape, are usually tablets, pills, capsules for pharmaceutical or parapharmaceutical use.

The blister band 5 includes a continuous sheet usually of heat-formable material, and is pulled horizontally in a direction M by pulling means, not shown, since they are known. The blister band comes from a blister forming device, not shown either.

The blisters 5a are regular, arranged according to a plurality of lines, whose numbers depends on the width of the band 5 and on the dimension of the blisters 5a.

In the illustrated case, delivering means 6, situated between the conveying channels 4 and the blister band 5, receive cyclically the products 2 from the outlet 4b of each channel 4 and put them inside the relative blisters 5a.

The delivering means 6 include a movable cylinder 7, which driven into rotation around a horizontal axis set crosswise to the blister band. Rotation of the cylinder 7 is caused by known, not shown means, in a direction N, concordant with the forward direction M of the band 5, in time relation therewith.

The cylinder is situated over the blister band 5 and has dimensions such as its outer surface 7a nearly touches the outlets 4b of the channels 4, at the upper part of the cylinder, and the blister band 5 at the lower part of the cylinder.

The surface 7a of the cylinder 7 features a plurality of angularly equispaced recesses 8, arranged along lines coincident with side by side circumferences of the cylinder 7.

There is a line of recesses 8 for each channel 4. Each recess 8 has regular symmetrical shape and a concave bottom 8a.

The cylinder 7 is arranged in such a position that a row of recesses 8 face respective outlets 4b of the channels 4 and the corresponding blisters 5a which are to house the products 2.

The cylinder 7 is provided with a system of chambers, which are kept alternatively, in suction and pressure conditions, so as to respectively, hold and release the products 2 present in the recesses 8, as disclosed in the document WO-A-96/18539 of the same Applicant.

Moreover, the cylinder 7 features a pairs of circular tracks 19 for each line of recesses 8. Each pair of tracks pass through the recesses 8 of a related line and are deeper than them.

Each pair of tracks 19 receive stationary removing members 20, e.g. a pair of blades.

The above mentioned means for driving the cylinder 7 cooperate with feedback control means 9 and allow a precise control of the cylinder 7 position. This ensures that each blister 5a is in perfect register with the corresponding recess 8 filled with a product 2 in the moment, in which the product 2 is released from the recess 8 to be introduced into the blister 5a.

According to the proposed embodiments, the control means 9 include an idle roller 10, situated below the band 5 and opposite to the movable cylinder 7.

A plurality of depressions 11 are made in the outer surface of the idle roller 10. The depressions 11 are arranged angularly equispaced in lines coincident with side by side circumferences located on the roller 10 so as to match the lines blisters 5a in the band 5 (FIG. 1).

The shape of the depressions marches the shape of the blisters.

The depressions 11 are gradually engaged by the outer surfaces of the blisters 5a, for driving the idle roller 10 to rotate in synchrony with the band 5 movement.

The idle roller 10 is connected, in known way, to a positioning group, co-operating with the delivering means 6 and aimed at constant detecting the angular position of the idle roller 10.

Operation of the device for feeding products will be now described beginning from a situation, in which the products 2 are situated in bulk inside the hopper 3.

The rotation of the roller 13 creates a slight upward movement of the products 2 present in the area of the channels 4 inlets.

The slight upward movement can be positively influenced by providing facets made in the roller 13.

Although irregular and casual, the slight upward movement prevents damages of the products 2, allowing, at the same time, the best introduction of the products 2 into the grooves defined by the toothing 13a of the roller 13.

This in possible due to mutual detachment of the products caused by the slight upward movement, in contrast to the gravity force, in area of the inlets 4a of respective channels 4.

What above facilitates the introduction of single products 2 into the channels 4, which ensures a predetermined orientation of the products 2. Then, the products are piled in the relative channels 4.

As shown in the figures, the outlet 4b of each channel 4 is flared and its section gradually increases outwards.

Due to the outlet 4b flared section, the product 2 rotate while entering the blister (see FIGS. 5a, 5b) because the lateral walls gradually space out; see the subsequent positions Z1, Z2, Z3, Z4 indicated with broken line up to the final position Z5, which is rotated by little less than 90 deg with respect to the initial position Z1.

The rotation of the product 2 is facilitated also by the fact that the base 8a of the recess 8 does not lie in a horizontal plane, but rather in a plane inclined with respect to the vertical diametrical plane of the cylinder 7.

The inclination is due to the fact that the plane of symmetry of the flat member 40 is shifted with respect to the diametrical plane of the cylinder 7.

The axial extension of the flaring of the outlet 4b of each channel, as well as its inclination, depend on the size of the product 2. In some cases the flaring can be avoided.

It results in the fact that, in order to change the size of the product 2, it is enough to substitute the flat member 40 with another one provided with suitable channels 4 and relative flares.

Obviously, the size change over requires at least the substitution of the roller 13 and of the part 130B, complementary thereto.

The product 2 is held inside the corresponding recess 8 by known techniques as described in the above mentioned document WO-A-96/18539.

While the blister band 5 is pulled in the direction M with a substantially constant velocity, the position and the rotation velocity at the cylinder 7 are adjusted by a motor in rotation to the information coming from the control means 9.

Due to the cylinder 7 rotation, the adjustments ensure that each recess 8 is brought to the position directly over the blister band 5, just in register with a blister 5a to be filled; in this situation, the product 2 is delivered, according to the techniques described in the document WO-A-96/18539, and falls on the blister band 5 and consequently, into a corresponding blister 5a.

The product 2 delivery is facilitated by the weight thereof and by the action of the pairs of blades 20, which, as they are running in the corresponding tracks 19, facilitate the removing of the products 2 from the recesses 8 without damaging them.

The pair of stationary blades 20, facilitate the removal of the product 2 present in the recess 8 which is situated in the point of tendency of the cylinder 7 with the blister band 5, and with the relative blister 5a.

The presence of at least two blades 20 for each line of recesses 8 makes for the products being positioned in best way, since the blades detach them from the recesses 8 keeping them parallel to the bottoms of the blisters 5a situated below.

For all embodiments described heretofore, a monitoring station 18 it situated downstream of the feeding device for verifying whether each blister 5a has been filled with a product 2.

If the monitoring station finds a blister not filled with a product 2, it causes its rejection in further working stations, which are not shown.

The proposed device for feeding products 2 to a blister band 5 situated below guarantees filling of the blisters 5a with only one product 2 in a particularly rapid way.

The slight upward movement creates an efficient mutual detachment of the products 2, which therefore are not damaged in any way by pushes and/or scratches, which otherwise could occur in the area of the protection shells of the products 2.

The particular shape of the toothing 13a of the roller 13 allows to define a plurality of grooves, whose horizontal sections, obtained considering a plane passing through the rotation axis thereof, coincide with the sections of the channels 4 inlets.

It is to be pointed out that the first roller 13 and the second roller 14 can move with diverse speed, so as to define a wide range of relative speeds, considering the speed of one roller with respect, to the other's one.

It is also to be noted that the number of elements of the proposed feeding device is limited and that these elements are simple to manufacture, which reduces the size and production costs of the device.

The proposed feeding device does not cause vibrations of the products, therefore, it does not produce dust and the noise caused thereby is negligible, or practically absent.

It is understood that what above has been described as a mere, non limitative example, therefore possible constructive variants of the proposed device remain within the protective scope of the present technical solution, and described above and claimed in the following.

What is claimed is:

1. A device for filling a blister band with products, with the blister band having at least one longitudinal line of blisters for receiving the products and driven in a forward direction (M), the device including:

a hopper (3), the products being stored in bulk within said hopper, with said hopper (3) being delimited by walls and having an open bottom;

taking over means (17), located at said open bottom of said hopper (3) and acting an said products, (2), so as to slightly push said products upwards, with said taking over means (17) defining at least one opening, with one product (2) at a time passing, suitably oriented, through said opening;

conveying means (40) defining at least one channel (4) having an inlet (4a) situated directly under said opening and an outlet (4b);

delivering means (6), connected to said channel (4) and aimed at transferring products (2) from said conveying means (40) to the blisters (5a) of said blister band (5);

the device being characterized in that said taking over means (17) include one roller (13), situated beside one wall of the hopper (3) and rotating upward in a region where the roller touches said hopper wall, with said roller (13) forming, on its outer surface, at least one circumferential groove, said groove defining, together with said hopper wall, said opening in said region where the roller touches said hopper wall.

2. A device, according to claim 1, characterized in that the outer surface of said roller (13) is smooth.

3. A device, according to claim 1, characterized in that the outer surface of said roller (13) features facets.

4. A device, according to claim 1, characterized in that the outlet (4b) of said channel (4) is flared with the section gradually increasing outwards.

5. A device, according to claim 1, characterized in that said delivering means (6) include the outlet (4b) of said channel (4), said outlet (4b) being situated directly over said band (5) and over the line of blisters (5a).

6. A device, according to claim 1, characterized in that said delivering means include a cylinder (7) with an outer surface featuring recesses (8) angularly equispaced, said cylinder (7) being situated between the outlet (4b) of said channel (4) and said blister band, and driven into rotation in a direction (N), matching with the forward direction (M) of the band, and in time relation therewith, so as to position each recess (8) directly under the outlet (4b) of said channel and, subsequently, directly over a corresponding blister (5a) of said blister band, with each of said recesses (8) being set first in vacuum condition, for holding a product falling, due to gravity force, from the outlet (4b) and then under pressure condition, with the recess (8) located over a blister (5a), for releasing the product to a relative blister (5a).

7. A device, according to claim 6, characterized in that it includes feedback control means (9) aimed at detecting the position of blisters (5a) and operating said motor means for positioning, together with said motor means, each recess (8) exactly over a corresponding blister (5a), with said feedback control means (9) including an idle roller (10), featuring a plurality of angularly equispaced depressions (11), each of said depression being aimed at being first engaged with and then disengaged from a corresponding blister, so as to rotate said idle roller (10) in synchrony with the blister band forward direction (M).

8. A device, according to claim 6, characterized in that it includes removing members (20), co-operating with said pressure condition of said recess (8) for removing a product from said recess (8) and placing said product into a blister (5a), said removing members including at least two stationary blades running into relative circumferential tracks made in said cylinder (7) and crossing the recesses (8) and being deeper than them, so that said track cross the recess, (8) being positioned over the blister (5a), so that said blades act on a product present in the recess.

* * * * *